J. C. & J. N. PENFIELD.
PRORATING WEIR.
APPLICATION FILED NOV. 28, 1911.

1,037,656.

Patented Sept. 3, 1912.

2 SHEETS—SHEET 1.

Witnesses
W. A. Williams.
Francis P. ———

Inventors
J. C. Penfield
J. N. Penfield.
By ——————
Attorney

COLUMBIA PLANOGRAPH CO., WASHINGTON, D. C.

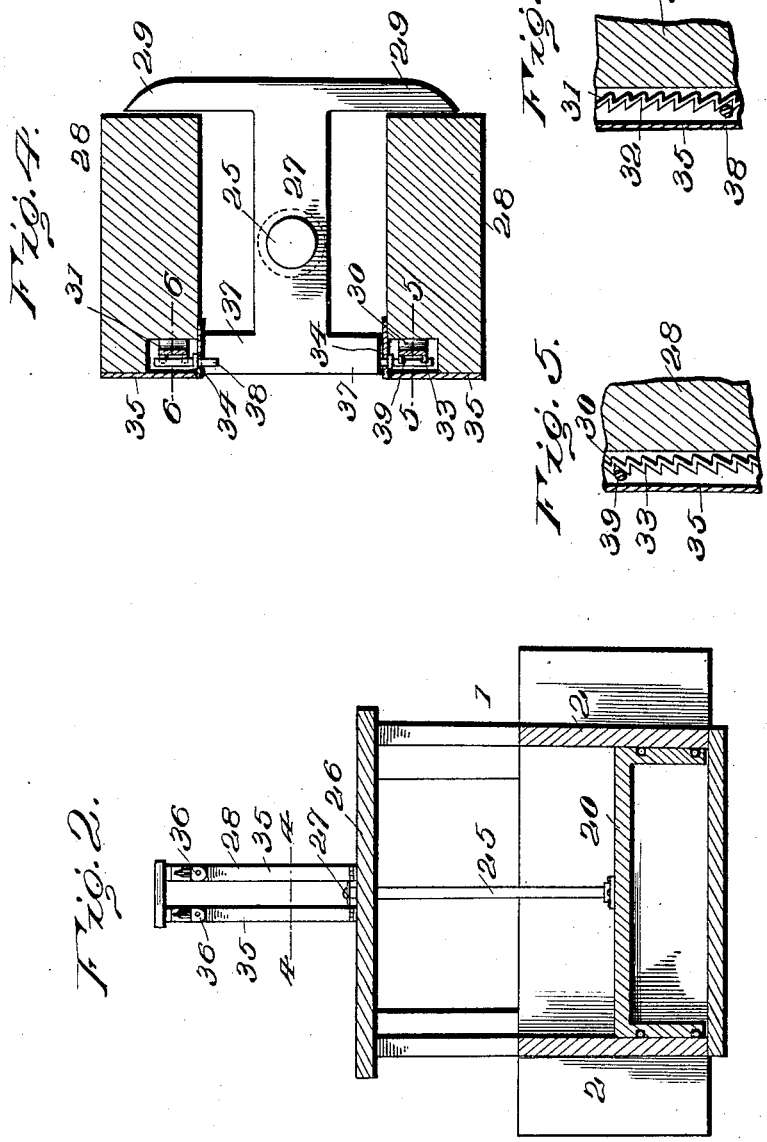

UNITED STATES PATENT OFFICE.

JAMES C. PENFIELD AND JOHN N. PENFIELD, OF GRAND JUNCTION, COLORADO, ASSIGNORS OF TWO-SIXTHS TO THOMAS F. LOUGHRAN, THREE-SIXTHS TO WILLIAM W. RICHARDS, AND ONE-SIXTH TO LINDA M. OLSEN, ALL OF GRAND JUNCTION, COLORADO.

PRORATING-WEIR.

1,037,656.  Specification of Letters Patent.  Patented Sept. 3, 1912.

Application filed November 28, 1911. Serial No. 662,899.

*To all whom it may concern:*

Be it known that we, JAMES C. PENFIELD and JOHN N. PENFIELD, both of Grand Junction, in the county of Mesa and State of Colorado, have invented certain new and useful Improvements in Prorating-Weirs; and we do hereby declare the following to be a full, clear, and exact description of the invention, such as will enable others skilled in the art to which it appertains to make and use the same.

The object of our invention is to provide an improved, simple and highly efficient prorating weir for regulating the flow of water through the head gate and laterals of an irrigating canal or ditch. And a further object is to provide simple and efficient means for indicating any tampering with the supply of water allotted to one or different persons.

The invention will be hereinafter fully set forth and particularly pointed out in the claims.

Figure 1:
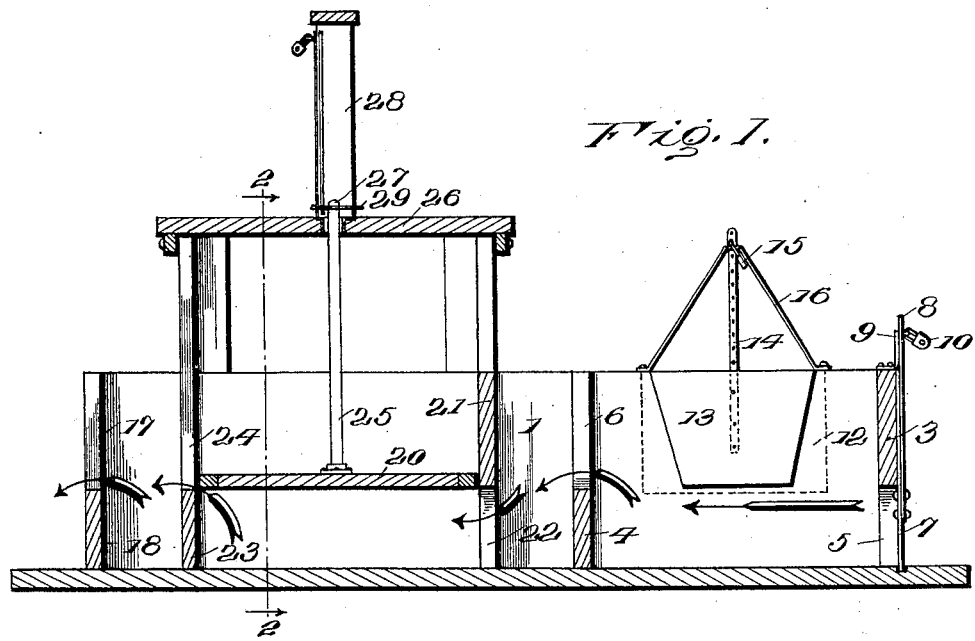
Figure 3:
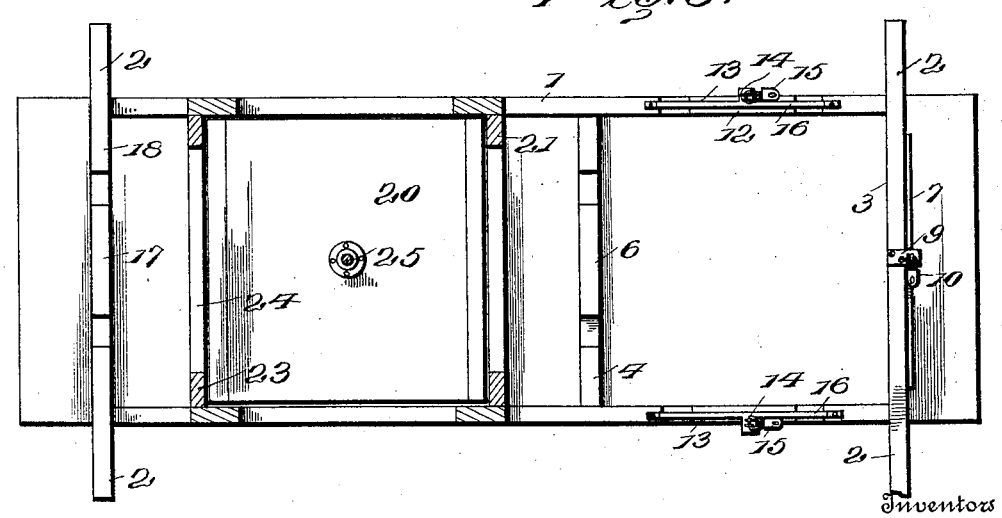

In the accompanying drawings, Figure 1 is a longitudinal sectional view. Fig. 2 is a cross section on line 2—2, Fig. 1. Fig. 3 is a plan view with parts in section and parts removed. Fig. 4 is a cross section on line 4—4, Fig. 2, and Figs. 5 and 6 are, respectively, vertical sections on lines 5—5, and 6—6, Fig. 4.

Referring to the drawings, 1 designates a housing, the bottom of which is sufficiently wide to insure a firm anchorage. At its opposite ends this housing has laterally projecting arms 2 which may be embedded in the banks of the irrigation ditch to prevent lateral displacement of the housing. The receiving end of the housing has parallel walls 3 and 4, the former being formed with an opening 5 at its bottom, while wall 4 has an opening 6 at its top. The inlet opening 5 is controlled by a gate valve 7, the construction of which may be widely varied, and any suitable means may be employed for locking the gate at any desired point, according to the number of cubic inches of water it is desired to have pass through the housing of the register. We have shown the gate as having a rod 8 which may be locked to a coöperating plate 9 secured to end wall 3, a conventional form of lock being indicated at 10.

In order to provide for lateral distribution of water, we have shown the opposite walls of the receiving chamber formed with upper outlet openings, one of which is indicated at 12, Fig. 1. Each of these openings is designed to be closed by a separate gate valve 13, of any preferred form of construction. These valves are also equipped with rods, such as 14, which may be secured by means of a lock, conventionally shown at 15, to bars 16 extending from the side walls of the housing.

Intermediate the receiving chamber and the straight-away outlet 17, formed in the upper end of wall 18, we locate an indicator for automatically recording any tampering with the supply through either of the lateral outlets or through the end outlet. According to the means shown, a float 20 is located between an upper wall 21, beneath which is an inlet opening 22, and a lower wall 23, paralleling wall 21, and above which wall 23 is an outlet opening 24. This float carries a centrally disposed rod 25 which projects upwardly through a superstructure 26 and carries at its upper end a head 27, which is located between parallel uprights 28, which are mounted on the superstructure 26. These parallel uprights may be provided with scales or graduation on one side over which are designed to travel laterally extending arms 29 of head 27, the ends of such arms being reduced to form pointers. Opposite inner corners of the uprights 28 are rabbeted to accommodate spring plates 30 and 31, each spring plate carrying two sets of rack teeth, the teeth 32 of plate 31 being the reverse of the teeth 33 of plate 30. At their opposite sides the rabbeted portions of the two uprights are closed by fixed plates 34, each of which is formed with a longitudinally extending slot, while the front faces of the rabbeted portions are designed to be closed by removable plates 35, each of which is shown in Fig. 2 as hinged at its lower end and fastened at its upper end, as by means of a lock 36. The head 27 is provided with laterally extending arms 37, and above and beneath these arms are designed to be located pins 38 and 39, the former being above the head and the latter beneath the head. These pins extend transversely of the rack teeth and project through the slots in the fixed plates 34. The pins are inserted in place when plates 35 are unlocked, and each pin is provided with a collar or other means for preventing it from being drawn outwardly through the slot in its respective plate 34. The descent of the float will cause the lowering of pin 39, pin 38 remaining in the position in which it was originally placed, while the ascent of the float will effect the raising of pin 38, pin 39 remaining unmoved.

In practice, let it be assumed that one hundred cubic inches of water are designed to be utilized. The head gate 7 of the receiving opening 5 is raised and when the arms 29 of the indicator show the presence of the desired quantity of water, gate 7 is locked so as to make the passage through the housing constant. If the user who is to be supplied through one of the lateral openings desires, say, a constant supply of twenty-five cubic inches of water, the gate 13 controlling his supply is opened until the indicator arms record seventy-five cubic inches, whereupon such latter gate is locked. This is continued in connection with the other lateral, and when all of the gates have been fixed the cover plates 35 are unlocked and the tell-tale pins 38 and 39 are placed, respectively, above and below head 27. The position of the float will be constant as long as the inlet and outlet valves remain in their adjusted positions. If any one should tamper with either valve, and thereby obtain more water than was intended, the float will necessarily lower, since the quantity of water passing through the end outlet 17 will be correspondingly lessened. The lowering of the float will cause pin 39 to move downwardly, the spring plate of the rack teeth giving sufficiently to allow such pin to move downwardly, but such rack teeth preclude the pin from being restored to its former position or moved upwardly without unlocking the respective plate 35. Should the person who is receiving the water going out through the end opening 17 obstruct the laterals, or either of them, so as to obtain for himself an additional supply of water, the float will rise, pushing upwardly pin 38, the spring plate 31 of the other set of rack teeth giving sufficiently to allow such pin to so move. In either event, the altered position of pin 38 or pin 39 will disclose that the supply either through the laterals or the end outlet has been changed.

Although we have shown and described the preferred means for carrying out our invention, yet it will be understood that changes may be made in the construction and arrangement of the parts without departing from the spirit of the invention.

We have shown the receiving chamber as provided with two lateral outlets, but it is obvious that these may be entirely dispensed with or the number thereof may be increased.

The advantages of our invention will be apparent to those skilled in the art. It will be seen that by means thereof the flow of water through the device may be made constant and that any variation in behalf of one user at the expense of another will be readily indicated by the changed position of one of the indicator pins.

We claim as our invention:

1. In a prorating weir having an inlet and an outlet for the water, means for controlling the inlet, means for rendering such inlet constant, means actuated by the water passing through the weir, and means actuated by the last mentioned means for indicating the maximum and minimum of the quantity of the passing water.

2. A prorating weir having a water inlet, means for controlling the inlet, means for rendering such inlet constant, a plurality of independent outlets, means operated by the water passing through the weir, and means actuated by the last mentioned means for indicating the maximum and minimum quantity of the passing water in any of the outlets.

3. A prorating weir having an inlet, means for controlling such inlet, means for rendering such inlet constant, an end outlet, a lateral outlet, means controlling such lateral outlet, means for fixedly holding the last mentioned means, means actuated by the water passing through the weir, and means operated by the last mentioned means for indicating any variation through either outlet.

4. A prorating weir comprising a housing having an inlet and outlet for water, a valve for regulating the inlet, means for locking such valve, a float actuated by the water passing through the housing, an indicating device comprising oppositely movable members designed to be actuated by either the rise or fall of the float, and means for fixedly holding such members in their altered positions.

5. The combination with a weir, of an indicating device comprising a vertically movable member, means actuated by the water passing through the weir for changing the position of such member, indicating elements designed to be moved by said member, and means for fixedly holding said elements when so moved.

6. The combination with a weir, of an indicating device comprising a vertically movable member, means actuated by the water passing through the weir for changing the position of such member, pins projecting above and below said member and designed to be moved thereby in its upward or downward travel, and means for engaging and holding said pins when disengaged by said member.

7. The combination with a weir, of an indicating device comprising a vertically movable member, means actuated by the water passing through the weir for changing the position of such member, pins projecting above and below said member, guideways for said pins, and oppositely disposed yielding rack bars with which said pins engage for holding said pins in the positions into which they may be moved by said member.

8. The combination with a weir, of an indicating device comprising a vertically movable member, means actuated by the water passing through the weir for changing the position of such member, pins projecting above and below said member, guideways for said pins, oppositely disposed rack bars with which said pins engage for holding said pins in the positions into which they may be moved by said member, and spring plates for holding said rack bars in their normal positions.

9. The combination with the housing having a water inlet and outlet, and means for regulating such inlet, of an indicator comprising a float, a vertically movable member carried by said float, uprights between which said member is located, pins projecting from said uprights and extending above and below said member, oppositely arranged rack bars mounted in said members for holding said pins in the positions into which they may be moved by said member, and plates for inclosing said rack bars and pins.

10. In a prorating weir, the combination with a housing having an inlet and an end outlet, and one or more lateral outlets, of valves for regulating the inlet of the water and the outlet through the lateral or laterals, means for fixedly holding such valves, a float actuated by the water passing through the weir, a vertically movable member carried by said float, said float being designed to rise or fall in the event of any change in the outlet through the lateral or laterals, indicating devices in engagement with said vertically movable member, one of said devices being designed to be moved upwardly by such member and the other designed to be moved downwardly by such member, and means for fixedly holding such devices in the positions into which they may be moved by such member.

In testimony whereof, we have signed this specification in the presence of two subscribing witnesses.

JAMES C. PENFIELD.
JOHN N. PENFIELD.

Witnesses:
  Wm. Weiser,
  T. F. Loughran.

---

Copies of this patent may be obtained for five cents each, by addressing the "Commissioner of Patents, Washington, D. C."